United States Patent Office 3,356,648
Patented Dec. 5, 1967

3,356,648
POLYAMIDE-ACIDS AND POLYIMIDES FROM HEXAFLUOROPROPYLIDINE BRIDGED DIAMINE
Francis Elliott Rogers, Wilmington, Del., assignor to E. I. du Pont de Nemours and Company, Wilmington, Del., a corporation of Delaware
No Drawing. Continuation of application Ser. No. 335,383, Jan. 2, 1964. This application Oct. 13, 1966, Ser. No. 586,572
8 Claims. (Cl. 260—47)

ABSTRACT OF THE DISCLOSURE

Linear polyimides and polyamide-acids including in their recurring units

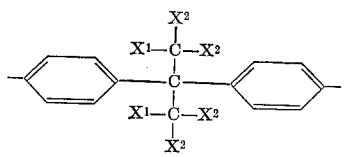

where $X^1$ is fluorine and $X^2$ is fluorine or chlorine. The polyimides are useful as films fibers, filaments, foams and powders.

*Related applications*

This application is a continuation of my application Ser. No. 335,383, filed Jan. 2, 1964, which, in turn, is a continuation-in-part of my earlier application Ser. No. 288,554, filed June 17, 1963, and both now abandoned.

This invention relates to novel polymeric materials and has as its primary object the preparation of a novel group of polyimides. Other objects will appear hereinafter.

The novel group of polyimides is characterized by a recurring unit having the following structural formula:

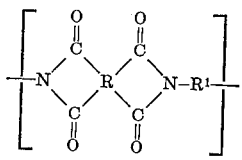

wherein R is a tetravalent aromatic radical, preferably containing at least one ring of six carbon atoms, said ring characterized by benzenoid unsaturation, the four carbonyl groups being attached directly to separate carbon atoms in a ring and each pair of carbonyl groups being attached to adjacent carbon atoms in a ring of the R radical; and wherein $R^1$ is a divalent benzenoid radical of the formula:

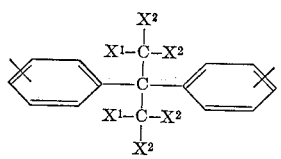

wherein $X^1$ is fluorine and $X^2$ is selected from the group consisting of chlorine and fluorine.

Each ring can be further substituted by halogen or lower alkyl.

The polyimides of the present invention display outstanding physical and chemical properties which make them very useful as shaped structures such as films, fibers, filaments, foams, powders and the like. The structures are characterized by high tensile properties, desirable electric properties and surprising stability to heat and water. In particular, they are low in color and sometimes even colorless.

One particularly useful polyimide falling within those of the present invention is the polyimide of the hexafluoropropylidene bridged diamine and dianhydride. This polyimide has recurring units of the formula:

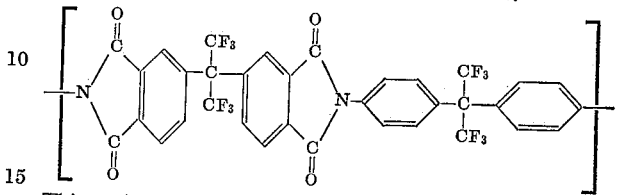

This polyimide has very unusual solubility properties, a moderately low softening temperature and good thermal stability. This contrasts with the intractibility and insolubility of most polyimides. Of course, other dianhydrides and diamines may be used along with the 4,4'-(hexafluoropropylidene)dianiline[1] and the 2,2-bis (3,4-dicarboxyphenyl)hexafluoropropane dianhydride to form copolyimides so long as they do not destroy the tractability or fusibility and the solubility of this useful polyimide.

The polyimides are prepared by reacting at least one organic diamine having the structural formula $$H_2N-R^1-NH_2$$

wherein $R^1$ is a divalent benzenoid radical of the formula:

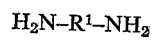

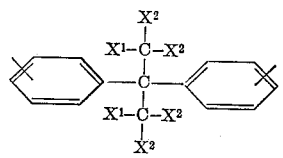

wherein $X^1$ is fluorine and $X^2$ is selected from the group consisting of chlorine and fluorine, with at least one tetracarboxylic acid dianhydride having the structural formula

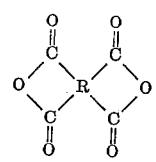

wherein R is a tetravalent aromatic organic radical, preferably containing at least one ring of six carbon atoms, said ring characterized by benzenoid unsaturation, the four carbonyl groups being attached directly to separate carbon atoms in a ring and carbon atoms of each pair of carbonyl groups being attached to adjacent (ortho or peri) carbon atoms in a ring of the radical.

The preferred process for preparing the polyimides of this invention involves first preparing a polyamide-acid having an inherent viscosity of at least 0.1, preferably 0.3–5, by the reaction of the diamine and the dianhydride in an organic solvent for at least one of the reactants, the solvent being inert to the reactants, preferably under substantially anhydrous conditions for a time and at a temperature below 175° C., sufficient to provide in most instances at least 50% of the corresponding polyamide-acid, and then converting the polyamide-acid to the polyimide, the polyimide also having an inherent viscosity of at least 0.1, preferably 0.3–5.

The inherent viscosity of the polyimide is measured at 30° C. as a 0.5% solution in a suitable solvent for the polyimide. For many polyimides of this invention, con-

[1] Also called 2,2-bis(4-aminophenyl)hexafluoropropane.

centrated (96%) sulfuric acid is a suitable solvent. However, the solvent may be selected from a group consisting of concentrated sulfuric acid, fuming nitric acid, the monohydrate of symdichloro tetrafluoroacetone and the hydrate of monochloropentafluoroacetone.

It is also preferred but not essential to form a shaped structure of the polyamide-acid composition prior to converting the polyamide-acid to the polyimide. In any event, the conversion of the polyamide-acid to the polyimide may be accomplished by a heat treatment or any of the chemical treatments or combinations of treatments as described hereinafter.

It should be understood that one purpose of the preferred process is to provide a composition containing enough polyamide-acid so that it can be shaped into useful objects prior to conversion of polyamide-acid to polyimide. It should also be understood that the polymers may be modified with inert materials prior to or subsequent to shaping. These modifying agents may be selected from a variety of types such as pigments, dyes, inorganic and organic fillers, etc.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling within the definitions given above, it is possible to form compositions of 100% polyamide-acid by conducting the reaction below 100° C. However, temperatures up to 175° C. may be tolerated to provide shapeable compositions. The particular temperature below 175° C. that must not be exceeded for any particular combination of diamine, dianhydride, solvent and reaction time to provide a reaction product composed of sufficient polyamide-acid to be shapeable will vary but can be determined by a simple test by any person of ordinary skill in the art.

The details of a preferred process involve premixing equimolar amounts of the diamine and the dianhydride as dry solids and then adding the mixture, in small proportions and with agitation, to the organic solvent. Premixing the ingredients and then adding them in small proportions to the solvent provides relatively simple means for controlling the temperature and the rate of the process. Since the reaction is exothermic and tends to accelerate very rapidly, it is important to regulate the additions to maintain the reaction temperature at the desired level. However, the order of addition may be varied. After premixing the diamine and the dianhydride, the solvent may be added to the mixture with agitation. It is also possible to dissolve the diamine in the solvent while agitating, preheat the solution and then add the dianhydride at a sufficiently slow rate to control the reaction temperature. Ordinarily, in this latter process the last portion of the dianhydride is added with part of the organic solvent. Another possible method involves adding the reactants to the solvent in small proportions, not as a premixture, but alternately; first diamine, then dianhydride, then diamine, etc. In any event, it is advisable to agitate the solution polymerization system after the additions are completed until maximum viscosity denoting maximum polymerization is obtained. Still another process involves dissolving the diamine in one portion of a solvent and the dianhydride in another portion of the same or another solvent and then mixing the two solutions.

The degree of polymerization of the polyamide-acid is subject to deliberate control. The use of equal molar amounts of the reactants under the prescribed conditions provides polyamide-acids of very high molecular weight. The use of either reactants in large excess limits the extent of polymerization. Besides using an excess of one reactant to limit the molecular weight of the polyamide-acid, a chain terminating agent such as phthalic anhydride may be used to "cap" the ends of the polymer chains.

In the preparation of the polyamide-acid intermediate, it is essential that the molecular weight be such that the inherent viscosity of the polymer is at least 0.1, preferably 0.3–5.0. The inherent viscosity of the polyamide-acid is measured at 30° C. at a concentration of 0.5% by weight of the polymer in a suitable solvent, e.g. N,N-dimethylacetamide. To calculate inherent viscosity, the viscosity of the polymer solution is measured relative to that of the solvent alone.

$$\text{Inherent Viscosity} = \frac{\text{natural logarithm} \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

The quantity of organic solvent used in the preferred process need only be sufficient to dissolve enough of one reactant, preferably the diamine, to initiate the reaction of the diamine and the dianhydride. For forming the composition into shaped articles, it has been found that the most successful results are obtained when the solvent represents at least 60% of the final polymeric solution. That is, the solution should contain 0.05–40% of the polymeric component. The viscous solution of the polymeric composition containing polyamide-acid in the polymeric component dissolved in the solvent may be used as such for forming shaped structures. The shaped articles composed of a substantial amount of the polyamide-acid, usually at least 50% of the polyamide-acid, are then converted to the respective polyimide shaped articles.

It should also be understood that instead of shaping the polyamide-acid composition into the usual articles, the polyamide-acid composition in the solvent may be used as a liquid coating composition. Such coating compositions may be pigmented with such compounds as titanium dioxide in amounts of 5–200% by weight. These coating compositions may be applied to a variety of substrates, for example, metals, e.g. copper, brass, aluminum, steel, etc., the metals in the form of sheets, fibers, wires, screening, etc.; glass in the form of sheets, fibers, foams, fabrics, etc.; polymeric materials, e.g. cellulosic materials such as cellophane, wood, paper, etc., polyolefins such as polyethylene, polypropylene, polystyrene, etc., polyamide polyesters such as polyethylene terephthalate, etc., perfluorocarbon polymers such as polytetrafluoroethylene, copolymers of tetrafluoroethylene with hexafluoroethylene, etc., polyurethanes, all polymeric materials in the form of sheets, fibers, foams, woven and non-woven fabrics, screening, etc.; leather sheets; etc. The polyamide-acid coatings are then converted to polyimide coatings by one or more of the processes to be described.

One process comprises converting the polyamide-acids having recurring units of the following structural formula:

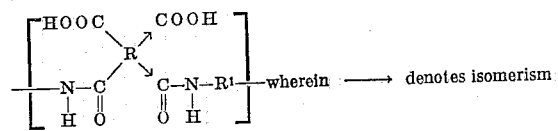

to polyimides by heating above 50° C. Heating serves to convert pairs of amide and carboxylic acid groups to imide groups. Heating may be conducted for a period of a few seconds to several hours.

A second process for converting the polyamide-acid composition to the polyimide thereof is a chemical treatment and involves treating the polyamide-acid composition with a dehydrating agent alone or in combination with a tertiary amine, e.g. acetic anhydride or an acetic anhydride pyridine mixture. The polyamide-acid shaped article can be treated in a bath containing the acetic anhydride-pyridine mixture. The ratio of acetic anhydride to pyridine may vary from just above zero to infinite mixtures. It is believed that the pyridine functions as a catalyst for the action of the cyclizing agent, the acetic anhydride. Other possible dehydrating agents for use include propionic anhydride, butyric anhydride and similar fatty-acid anhydrides as well as aromatic anhydrides. Other tertiary amine catalysts include triethylamine, isoquinoline, alpha, beta or gamma-picoline, 2,5-lutidine, etc. These chemical conversion treatments are more fully disclosed in copending application Ser. No. 169,106 (now U.S. Patent No. 3,179,630) and Ser. No. 169,108, (now U.S. Patent No. 3,179,632), both assigned to the assignor of the present application.

As a third process of conversion, a combination treatment may be used. The polyamide-acid may be partially converted to the polyimide in a chemical conversion treatment and then cyclization to the polyimide may be completed by subsequent heat treatment. The conversion of the polyamide-acid to the polyimide in the first step should still provide a shapeable composition if it is desired to shape the composition into suitable forms. After shaping, the completion of the cyclization of the polyimide/polyamide-acid may be accomplished.

The presence of polyimides is evidenced by their insolubility in cold basic reagents as opposed to the rapid solubility of the polyamide-acid. Their presence is also apparent if the polyamide-acids are scanned with infrared during conversion to the polyimide. The spectra initially show a predominating absorption band at ca. 3.1 microns due to the NH bond. This band gradually disappears and as the reaction progresses, the polyimide absorption bands appear, a doublet at ca. 5.64 and 5.89 microns and a peak at 13.85 microns. When conversion is completed, the characteristic polyimide band predominates.

The starting materials for forming the products of the present invention are specific organic diamines and tetracarboxylic acid dianhydrides. The organic diamines are characterized by the formula $H_2N-R^1-NH_2$ wherein $R^1$ is a divalent benzenoid radical of the formula:

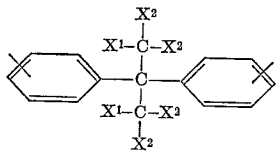

wherein $X^1$ is fluorine and $X^2$ is selected from the group consisting of chlorine and fluorine. These diamines may be prepared by condensing two moles of an aromatic amine with a fluoroketone in the presence of aluminum chloride, as described in U.S. application S.N. 288,539, filed June 17, 1963 by D. G. Coe and in the Canadian equivalent of Coe's application, now Canadian Patent No. 719,281. Each ring can be further substituted by halogen or lower alkyl. Among the diamines which are suitable for use in the present invention are:

4,4'-(hexafluoroisopropylidene)-dianiline;
4,4'-(hexafluoroisopropylidene)-bis(2,6-dibromoaniline);
4,4'-(hexafluoroisopropylidene)-bis(2,6-dimethylaniline);
4,4'-(hexafluoroisopropylidene)-bis(2-bromoaniline);
4,4'-(hexafluoroisopropylidene)-bis(2-methylaniline);
4,4'-(hexafluoroisopropylidene)-bis(2-chloroaniline);
4,4'-(hexafluoroisopropylidene)-bis(2,6-dichloroaniline);
4,4'-(chloropentafluoroisopropylidene)dianiline;
4,4'-(chloropentafluoroisopropylidene)-bis(2,6-dibromoaniline);
4,4'-(1,3-dichloortetrafluoroisopropylidene)-bis(2-aminotoluene);
4,4'-(1,3-dichlorotetrafluoroisopropylidene)dianiline; and
4,4'-(1,3-dichlorotetrafluoropropylidene)-bis(2-aminotoluene).

The tetracarboxylic acid dianhydrides are characterized by the following formula:

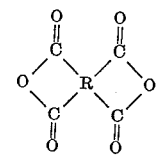

wherein R is a tetravalent organic radical containing at least 6 carbon atoms characterized by benzenoid unsaturation, wherein the 4 carbonyl groups of the dianhydride are each attached to separate carbon atoms and wherein each pair of carbonyl groups is directly attached to adjacent carbon atoms in the R group to provide a 5-membered ring as follows:

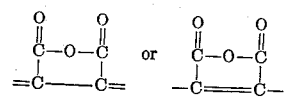

Illustrations of dianhydrides suitable for use in the present invention include: pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl) propane dianhydride, bis(3,4-dicarboxyphenyl) sulfone dianhydride, perylene 3,4,9,10-tetracarboxylic acid dianhydride, bis(3,4-dicarboxyphenyl) ether dianhydride, naphthalene-1,2,4,5-tetracarboxylic dianhydride, 2,2-bis(2,3-dicarboxyphenyl) propane dianhydride, 1,1-bis(2,3-dicarboxyphenyl) ethane dianhydride, 1,1-bis(3,4-dicarboxyphenyl) ethane dianhydride, bis(2,3-dicarboxyphenyl) methane dianhydride, bis(3,4-dicarboxyphenyl) methane dianhydride, benzene-1,2,3,4-tetracarboxylic dianhydride, pyrazine-2,3,5,6-tetracarboxylic dianhydride, thiophene-2,3,4,5-tetracarboxylic dianhydride, 3,4, 3',4'-benzophenone tetracarboxylic dianhydride, 2,2-bis(3,4-dicarboxyphenyl)-hexafluoropropane dianhydride, and similar dianhydrides having the formula

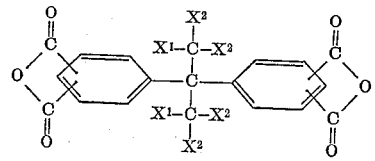

each pair of carboxyl groups of each anhydride moiety being attached directly to adjacent carbon atoms of each benzenoid radical, $X^1$ being fluorine and $X^2$ being fluorine or chlorine prepared as in the aforementioned Coe application.

The inclusion of one or more diamines or dianhydrides other than those disclosed, e.g. aliphatic diamines or aliphatic dianhydrides or other aromatic reactants, as reactants in the process may detract from one or more desirable properties of the polymeric products. However, the inclusion of such materials, to the extent that they do not detract substantially from the desirable results obtained with the stated reactants, is contemplated in the formation of the corresponding copolymers.

The solvents useful in the solution polymerization process for synthesizing the intermediate polyamide-acid compositions in the preferred process of preparing the polyimides are the organic solvents whose functional groups do not react with either of the reactants (the diamines or the dianhydrides) to any appreciable extent. Besides being inert to the system and, preferably, being a solvent for the product, the organic solvent must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydro groups. The normally liquid organic solvents of the N,N-dialkylcarboxylamide class are useful as solvents in the process of this invention. The preferred solvents are the lower molecular weight members of this class, particularly N,N-dimethylformamide and N,N-dimethylacetamide. They may easily be removed from the polyamide-acid and/or polyamide-acid shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used in the present invention are: dimethylsulfoxide, N-methyl-2-pyrrolidone, tetramethylene urea, pyridine, dimethylsulfone, hexamethylphosphoramide, tetramethylene sulfone, formamide, N-methylformamide, butyrolactone and N-acetyl-2-pyrrolidone. The solvents can be used alone, in combinations of solvents, or in combination with poor solvents such as benzene, benzonitrile, dioxane, xylene, toluene and cyclohexane.

The invention will be more clearly understood by referring to the examples which follow. These examples, which illustrate specific embodiments of the present invention should not be construed to limit the invention in any way.

Example 1

Pyromellitic dianhydride is added to an equimolar amount of 4,4'-(hexafluoroisopropylidene)-dianiline or 2,2-bis(4-aminophenyl) hexafluoropropane dissolved in about 10 parts by weight of N,N-dimethylacetamide at room temperature with agitation. After polymerization to an inherent viscosity of 0.6 (measured at 0.5% in N,N-dimethylacetamide) has occurred, the solution is chilled, and a stoichiometric excess (based on the number of free carboxyl groups) of acetic anhydride is added, using beta-picoline as the converting catalyst. The reaction mixture is cast onto a steam-heated plate. The chemical conversion to polyimide film and removal of solvent, excess converting agents and by-products of these are completed by heating at 270–300° C. for about two hours. The resulting polyimide film is clear, tough, and of very low color.

Examples 2–6

The corresponding polyimide film results from substituting each of the following dianhydrides for pyromellitic dianhydride in the procedure of Example 1:

2,2-bis(3,4-dicarboxyphenyl)propane dianhydride;
bis(3,4-dicarboxyphenyl)methane dianhydride;
bis(3,4-dicarboxyphenyl)sulfone dianhydride;
bis(3,4-dicarboxyphenyl)ether dianhydride; and
3,4,3',4'-benzophenone tetracarboxylic dianhydride.

In all five cases, films of similar quality to that of Example 1 result from casting the unmodified polyamide-acid solution and heating at about 300° C. for several hours.

Examples 7–9

The procedure of Example 1 produces the corresponding high quality polyimide film when each of the following diamines is substituted for 2,2-bis(4-aminophenyl) hexafluoropropane:

4,4'-(hexafluoroisopropylidene)-bis(2-methylaniline);
4,4'-(chloropentafluoroisopropylidene)diamiline; and
4,4'-(1,3-dichlorotetrafluoroisopropylidene)dianiline.

Example 10

In a nitrogen atmosphere and at about room temperature, 2.18 grams (0.01 mole) of pyromellitic dianhydride is added portionwise to a stirred solution of 3.34 grams (0.01 mole) of 2,2-bis(4-aminophenyl) 1,1,1,3,3,3-hexafluoropropane or 4,4'-(hexafluoroisopropylidene)dianiline in 35 ml. of anhydrous pyridine. An additional 50 ml. of anhydrous pyridine is added after completing the anhydride addition. The somewhat viscous solution is then heated rapidly to 125° C., and this temperature is maintained for fifteen minutes. After cooling, the fine yellow precipitate which has formed is removed by filtration, is carefully washed with acetone and is dried in a vacuum oven at 60° C. for two hours. The powder is then heated at 300° C. for 15 hours in a nitrogen atmosphere. A portion of this powder is transferred to a cylindrical mold, 1¼" in diameter, and is subjected to a pressure of 20,000 p.s.i. at about 385° C. The resulting chip appears to be strong and tough indicating that the powder has coalesced to a homogeneous piece and that fabrication to useful mechanical objects under similar conditions would be possible.

Example 11

One hundrede grams (0.275 mole) of hexafluoroisopropylidene bis(o-xylene) and 720 grams (4 moles) of 35% nitric acid are heated together in an autoclave at 180° C. for 2 hours. The bis(phthalic acid) precipitates and is separated by filtration. It weighs 111.5 grams and melts at about 225° C. After melting, it solidifies as it converts to the dianhydride, which remelts at 243.5°–247.5° C. The bulk of the tetra-acid is converted to 2,2-bis(3,4-dicarboxyphenyl)hexafluoropropane dianhydride by heating 16–18 hours in a vacuum oven at 160°–170° C. The dianhydride melts at 252°–253° C. after it is recrystallized from a mixture of 700 ml. of glacial acetic acid and 150 ml. of acetic anhydride.

A 0.001 mole portion (0.4442 g.) of this dianhydride and 0.001 mole (0.3343 g.) of bis(4-aminophenyl)hexafluoropropane are stirred together in 7 ml. of dioxane for about 18 hours at room temperature. A sample thinned to 0.5% solids with N,N-dimethylacetamide shows an inherent viscosity of 0.52 at 30° C.

To the bulk of the polyamide-acid solution is added 0.8 ml. of acetic anhydride and 0.08 ml. of beta-picoline. After stirring for 15 minutes without cooling, the mixture is poured onto a glass plate. The plate bearing the gel film is heated in an oven at 120° C. for 12 hours and then at 250° C. for 2 hours. The resulting polyimide film is clear and colorless. It is soluble in chloroform, benzene, dioxane and in acetone. Its glass transition temperature is about 340° C. It is infusible to 400° C., and thermal degradation in air begins at about 475° C. A 10% solution of this polyimide in acetone is used to coat a film of the polypyromellitimide of bis(4-aminophenyl) ether.

The polyimides of this invention find many applications in a wide variety of physical shapes and forms. Among the most significant of these forms are films and fibers. The useful combination of the desirable physical and chemical characteristics of this polymer is unique. Films and fibers of this polymer not only possess excellent physical properties and appearance (low color) at room temperature, but retain their strength and excellent response to work-loading at elevated temperatures for prolonged periods of time. Behavior of this type offers commercial utility in a wide range of end uses. The polyimide polymer of this invention is distinguished in having a combination of excellent resistance to corrosive atmospheres and an outstanding resistance to degradation by high energy particles and gamma ray radiation. Because of the unusual and surprising solubility of the polymer precursor in the preferred process of preparation, this polymer precursor may be processed into shaped articles such as films and fibers by conventional techniques and then converted in situ to the polyimide polymer of the invention.

Many of these polyimides soften at temperatures sufficiently low that they are useful as adhesives or self-sealing structures. In addition they can be shaped as polyimides. Furthermore some of these polyimides are so soluble that they can be used for coatings or shaped from solutions.

Films formed from the polymer of this invention may be used wherever films have heretofore been used. They serve advantageously in an extensive variety of wrapping, packaging and bundling applications. Additionally, the polymer and film-forming polymer may be used in automobile and aviation interior head lining materials, in decorative trim, in high temperature electrical insulation for motor slot liners, motor phase insulation, in transformers, capacitors, coil and cable wrappings (form wound coil insulation for motors), for packaging items to be exposed to high temperature or high energy radiation while within the package, in corrosion-resistant pipe, pipe-lagging and duct work, for containers and container linings, and in laminating structures where the films are bonded to the sheet metal or foils. Laminating can be accomplished with epoxy resin adhesives.

The film can also serve as a printed circuit backing. Electric circuits can be made by coating the polyimide film with a thin layer of copper or aluminum, either by coating the metal with polyamide-acid and converting to polyimide, or by laminating to a polyimide film, or by vacuum metallization of the film. The circuit design is covered by a protective coating and the extra metal is etched off followed by washing to halt the etching.

The film also can serve as the outer, insulating layers of flat wire and cable assemblies, in which flat wires or metal strips are laminated between layers of polyimide film. The laminated structure can then be slit longitudinally to produce strips of flat wire, each of which is insulated by being imbedded between two polyimide layers, except at the termination. Such assemblies can be in multilayers, i.e. alternating layers of film and metal. Alternatively, the wire can be coated as described in the examples to have a polyimide coating. The coated wire can then be coated with a second type of polymeric coating, such as silicones, polyamides, polyesters, tetrafluoroethylene and its copolymers with hexafluoropropylene, polyvinyl acetals, e.g. polyvinyl butyral, and epoxy resins.

In fiber form, the polymer of the present invention offers possibilties for high temperature electrical insulation, protective clothing and curtains, filtration media, packing and bearing materials, brake linings and clutch facings.

In summary, the polymer has potentiality in a wide variety of applications. Some other possibilities include: as a finish for oven interiors, dryer liner, muffler finish, liner for high temperature plant equipment, liner for hot water heaters, shatter-proof coating for glass in very thin films where high heat is involved (high wattage lamps, Pyrex baking dishes, etc.), as a low friction and high temperature lubricating film, as a flame-retardant paint, in heating elements made by incorporating either metallic conducting strips or conductive coatings of the "Chemelux" type, in belting for use in high temperature conveyors, as a liner for packaging of molten materials as an underlay for flammable roofing, as coalescible powders of relatively low color, and, in some cases, as molding powders.

I claim:

1. A linear polyimide consisting essentially of the recurring units of

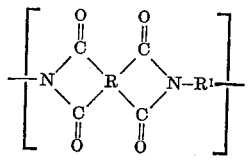

wherein

R is a tetravalent aromatic radical containing at least one ring of six carbon atoms, said ring characterized by benzenoid unsaturation, the four carbonyl groups being attached directly to separate carbon atoms in a ring of the R radical and each pair of carbonyl groups being attached to adjacent carbon atoms in a ring of the R radical;

$R^1$ is a divalent benzenoid radical of the formula

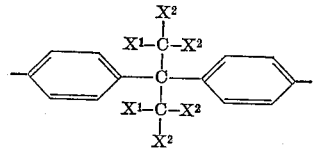

wherein $X^1$ is fluorine and $X^2$ is selected from the group consisting of fluorine and chlorine, said polyimide having an inherent viscosity of at least 0.1 as measured at 30° C. on a 0.5% by weight solution in a solvent therefor selected from the group consisting of sulfuric acid, nitric acid, the monohydrate of dichlorotetrafluoroacetone and the hydrate of monochloropentafluoroacetone.

2. A linear polyimide as in claim 1 wherein R is selected from the group consisting of aromatic radicals in pyromellitic dianhydride, 2,3,6,7-naphthalene tetracarboxylic dianhydride, 3,3',4,4' - diphenyl tetracarboxylic dianhydride, 1,2,5,6 - naphthalene tetracarboxylic dianhydride, 2,2',3,3'-diphenyl tetracarboxylic dianhydride, 2,2-bis(3,4-dicarboxyphenyl) propane dianhydride, bis(3,4 - dicarboxyphenyl) methane dianhydride, bis(3,4 - dicarboxyphenyl) sulfone dianhydride, 3,4,9,10 - perylene tetracarboxylic acid dianhydride, bis(3,4-dicarboxyphenyl) ether dianhydride, 3,4,3',4'-benzophenone tetracarboxylic dianhydride and 2,2-bis(3,4 - dicarboxyphenyl) hexafluoropropane dianhydride.

3. A linear polyimide as in claim 1 wherein $R^1$ is selected from the group consisting of benzenoid radicals in 2,2-bis(4-aminophenyl) hexafluoropropane: 4,4'-(hexafluoroisopropylidene)-bis(2-methylaniline); 4,4' - (chloropentafluoroisopropylidene)dianiline; and 4,4' - (1,3 - dichlorotetrafluoroisopropylidene)dianiline.

4. A linear polyimide as in claim 1 in the form of a self-supporting film.

5. A linear polyamide-acid consisting essentially of the recurring units of

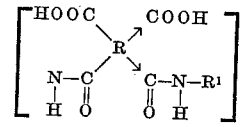

wherein

R is a tetravalent aromatic radical containing at least one ring of six carbon atoms, said ring characterized by benzenoid unsaturation, the four carbonyl groups being attached directly to separate carbon atoms in a ring of the R radical and each pair of carbonyl groups being attached to adjacent carbon atoms in a ring of the R radical;

$R^1$ is a divalent benzenoid radical of the formula

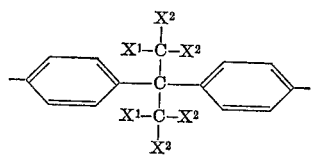

wherein $X^1$ is fluorine and $X^2$ is selected from the group consisting of fluorine and chlorine, said polyamide-acid having an inherent viscosity of at least 0.1 as measured on a 0.5% by weight solution thereof in N,N-dimethylacetamide at 30° C.

6. A linear polyamide-acid as in claim 5 wherein R is selected from the group consisting of aromatic radicals in pyromellitic dianhydride, 2,3,6,7-naphthalene tetracarboxylic dianhydride, 3,3',4,4'-diphenyl tetracarboxylic dianhydride, 1,2,5,6 - naphthalene tetracarboxylic dianhydride, 2,2',3,3'-diphenyl tetracarboxylic dianhydride, 2,2-bis(3,4-dicarboxyphenyl) propane dianhydride, bis(3,4-dicarboxyphenyl) methane dianhydride, bis(3,4 - dicarboxyphenyl) sulfone dianhydride, 3,4,9,10-perylene tetracarboxylic acid dianhydride bis(3,4 - dicarboxyphenyl) ether dianhydride, 3,4,3',4'-benzophenone tetracarboxylic dianhydride and 2,2-bis(3,4-dicarboxyphenyl) hexafluoropropane dianhydride.

7. A linear polyamide-acid as in claim 5 wherein $R^1$ is selected from the group consisting of benzenoid radicals in 2,2-bis(4-aminophenyl) hexafluoropropane: 4,4'-(hexafluoroisopropylidene) - bis(2 - methylaniline); 4,4' - (chloropentafluoroisopropylidene)dianiline; and 4,4'-(1,3 - dichlorotetrafluoroisopropylidene)dianiline.

8. A linear polyimide consisting essentially of the recurring units of

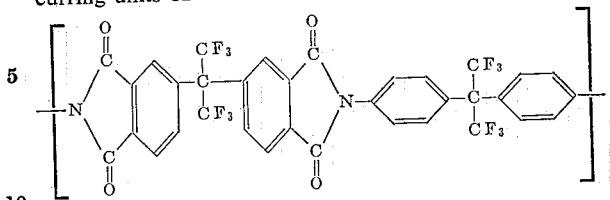

References Cited

UNITED STATES PATENTS

| | | | |
|---|---|---|---|
| 2,570,180 | 10/1951 | Allwelt | 260—78 |
| 3,179,614 | 4/1965 | Edwards | 260—78 |
| 3,179,631 | 4/1965 | Endrey | 260—78 |
| 3,179,634 | 4/1965 | Edwards | 260—78 |

WILLIAM H. SHORT, *Primary Examiner.*

H. D. ANDERSON, *Assistant Examiner.*